(No Model.)

J. J. WALSH.
MACHINE FOR CLEANING AND BRIGHTENING DRIED FRUIT.

No. 323,000. Patented July 28, 1885.

UNITED STATES PATENT OFFICE.

JOSEPH J. WALSH, OF STRATFORD, ONTARIO, CANADA.

MACHINE FOR CLEANING AND BRIGHTENING DRIED FRUIT.

SPECIFICATION forming part of Letters Patent No. 323,000, dated July 28, 1885.

Application filed January 23, 1885. (No model.) Patented in Canada January 22, 1885, No. 20,945.

*To all whom it may concern:*

Be it known that I, JOSEPH JAMES WALSH, of the town of Stratford, in the county of Perth, in the Province of Ontario, Canada, merchant, have invented a certain new and useful Machine for Cleaning and Brightening Dried Fruit; and I do hereby declare that the following is a full, clear, and exact description of the same.

The object of the invention is a simple and effective machine for cleaning and brightening raisins, currents, and other dried fruit of like nature; and it consists in the peculiar combinations and the construction and arrangement of parts hereinafter more fully described and claimed.

Figure 1:
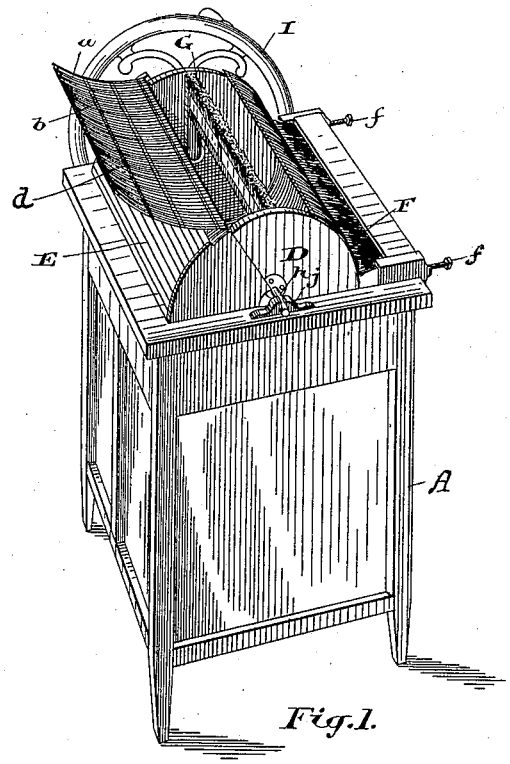
Figures 2, 3:
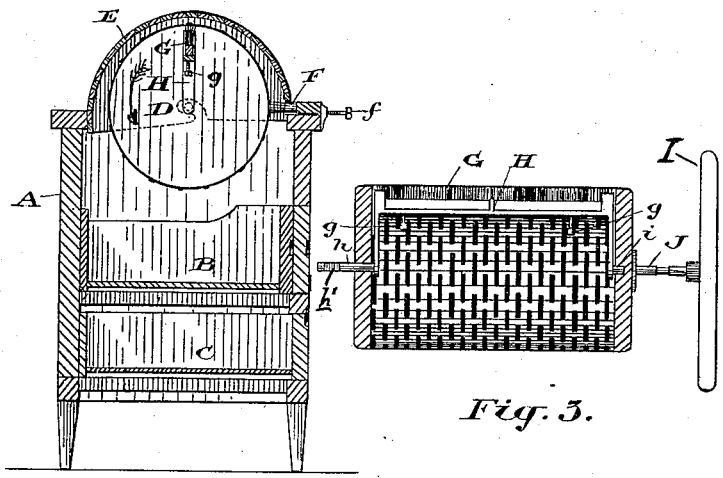

Figure 1 is a perspective view showing my improved machine opened to receive the fruit. Fig. 2 is a cross-section of the machine, showing it closed ready for operation. Fig. 3 is a longitudinal detail of the cylinder and the brush-carrying frame, partly in section.

A is a frame or box provided with two drawers, B and C, located, as indicated, below the cylinder D, which is journaled on the top of the box A, and provided with an adjustable or sliding cover, E. This cover is arranged so that it will slide out of the way, as indicated in Fig. 1, when it is desired that the top of the cylinder shall be open; but when it is necessary to cover the top of the cylinder the said cover E can easily be adjusted to accomplish that purpose, as indicated in Fig. 2. When the cylinder is made of wire, the wire strands $a$, which form the body of the cylinder D, extend around its circumference, and are held together at short distances apart by the wire strands $b$, which are interwoven through the wire strands $a$ at such distances apart as may be necessary to hold the said strands $a$ together, but no closer than may be necessary for that purpose.

F is a brush held on the outside and at the top of the box A. This brush is held in suitable guides, and may be adjusted by the set-screws $f$, which are provided in order that the brush F may be held adjustably against the outside of the cylinder D.

G is another brush, similar to F, but held in the frame H on the inside of the cylinder. This latter brush G is also provided with set-screws $g$, by which it may be adjusted so as to act against the inside surface of the cylinder D. When the cylinder D is made to revolve, all the dirt or foreign substance from the fruit is effectually cleaned from the strands $a$ by the brushes F and G, and, the spaces between the strands being thus effectually kept open, the dirt and other foreign substance will fall through the said spaces into the drawer C, the top drawer, B, having been previously removed. When the fruit is cleaned and brightened sufficiently, the drawer B is inserted in position, and the cover E being opened the hinged section $d$ is opened, and upon the cylinder D being turned so as to bring the said opening to its bottom, the fruit within the cylinder falls through into the drawer B, which is then removed and the cylinder refilled with fruit, the hinged section $d$ and cover E closed, and the operation repeated.

On reference to Fig. 3, it will be seen that the frame H, which carries the brush G, is provided with two spindles, $h$ and $i$, the spindle $h$ passing through the end of the cylinder D, so as to rest in the bearing-box $j$, its end being flattened at $h'$, as indicated in Fig. 3, so that it cannot revolve within its bearing-box. The other spindle $i$ does not pass entirely through the opposite end of the cylinder D, merely entering sufficiently to be supported therein. The hand-wheel I is fastened to the spindle J, which is itself secured to the end of the cylinder, as indicated in Fig. 3. This spindle J rests in a suitable bearing placed upon the top of the box A, which bearing corresponds with the bearing-box $j$, but is so formed that it permits the spindle J to revolve in it. When the hand-wheel I is turned the cylinder D is caused to revolve upon the spindles $h$ and $i$, which spindles, as before stated, are attached to the frame H, and remain stationary with the said frame. Owing to this construction the cylinder D revolves, while the brush G remains stationary. Consequently the fruit within the cylinder is agitated and thereby cleaned, while the spaces between the strands $a$ are kept open by the action of the brush G, assisted by the brush F.

When the cylinder is made of sheet metal, as shown in Fig. 3, the perforations must be made oblong and extending in length around the circumference of the cylinder. This form allows the stems of the raisins to escape easily, and the perforations are otherwise easily kept clean by the action of the brushes.

It will be observed that the spaces between the wires in the cylinder, shown in Fig. 1, and the perforations in the sheet-metal cylinder, shown in Fig. 3, all are oblong and extend transversely to the axis of the cylinder. It will also be noticed that the brushes F and G are set substantially at right angles to each other, one on the outside of said cylinder and the other on the inside. This I deem important, for by this construction the fruit is most effectually cleaned. The cylinder revolving in the direction of the arrow in Fig. 2, the bristles of the brush G working through the oblong slots, tend constantly to push all the stems, sticky dirt, and other foreign matter through the perforations to the outside of the cylinder, from whence they are scraped off by the brush F, which brush keeps the spaces open and prevents any sticky matter being carried farther by the cylinder.

What I claim as my invention is—

1. In a fruit-cleaner, the cylinder D made of sheet metal and having made in it oblong perforations extending transversely to the axis of the cylinder, in combination with the adjustable brushes F G, arranged at right angles to each other, one on the outside and the other on the inside of said cylinder, substantially as and for the purposes specified.

2. The frame H, the brush G, carried thereby, the stationary spindles $i$ and $h$, and the cylinder D, in combination with a hand-wheel, I, and the spindle J, substantially as and for the purpose specified.

3. The cylinder D, the frame H, carrying the brush G and provided with the spindles $h$ $i$, the spindle $i$, supported by said cylinder and the spindle $h$ passing through the end of the cylinder and having a flattened portion, $h'$, and the bearing-box $j$, in combination with the spindle J, secured to the end of the said cylinder, and the hand-wheel I, fastened to said spindle, substantially as and for the purposes specified.

JOSEPH J. WALSH.

In presence of—
JOHN IDINGTON,
J. FRANK PALMER.